May 27, 1941.  J. W. RICHARDSON  2,243,605
GREASE FITTING
Filed Aug. 5, 1939
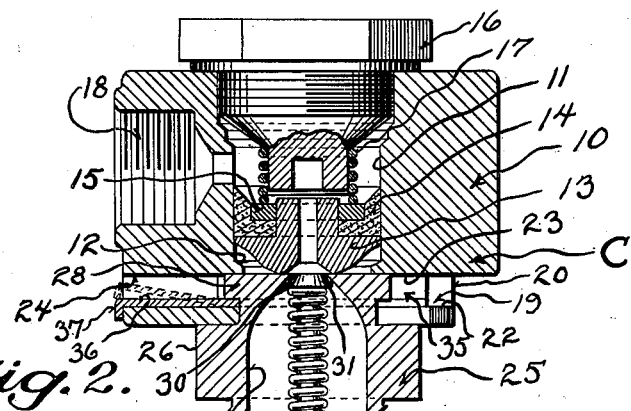
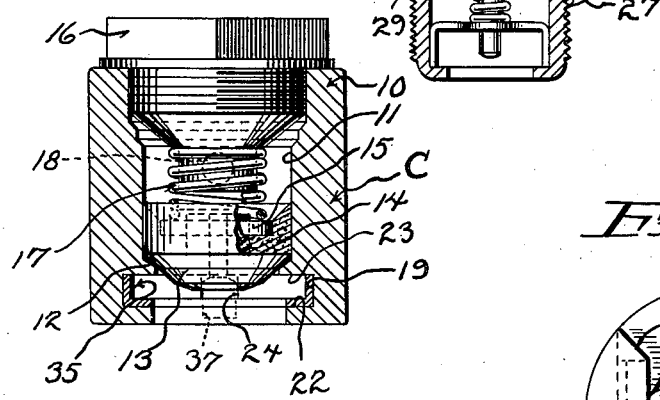
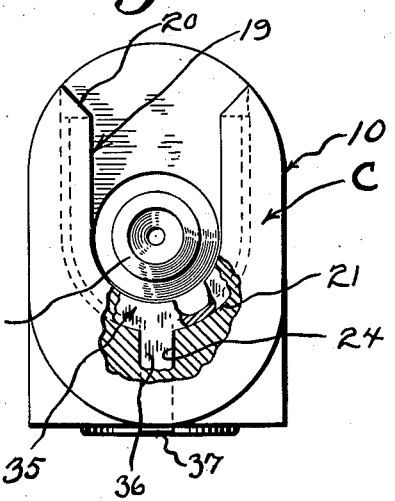
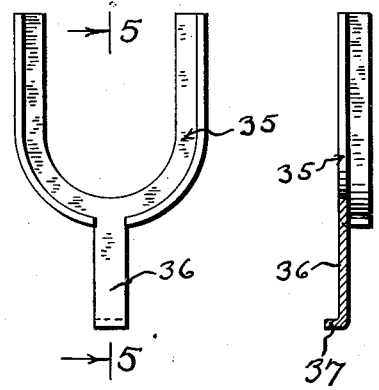
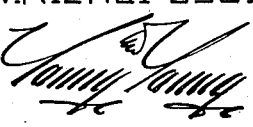
Inventor
J. W. Richardson
By
Attorneys Patented May 27, 1941

2,243,605

UNITED STATES PATENT OFFICE 2,243,605

GREASE FITTING

John W. Richardson, Milwaukee, Wis., assignor to The Prime Manufacturing Company, Milwaukee, Wis.

Application August 5, 1939, Serial No. 288,557

2 Claims. (Cl. 285—143)

This invention appertains to lubrication, and more particularly to grease fittings or couplings employed for connecting the grease-carrying pressure hose or grease gun, as the case may be, with the grease-receiving nipple connected to the part to be lubricated.

In couplings of the above character, great wear takes place between the nipple and coupling body, due to the constant coupling and uncoupling of the parts and the pulsating pressure of the grease, causing a certain movement of the parts. In order to bring about a seal between the parts, a spring-pressed plunger is carried by the coupling body for engaging about the nipple inlet. However, as wear takes place, the seal is broken, and not only does loss of grease take place, but the desired amount of grease fails to reach the part to be lubricated.

Effort has been made to overcome this difficulty, and the metal has been hardened (in various ways) on the coupling body at the point where the greatest wear takes place. However, this does not solve the difficulty, as wear still takes place and the metal, after hardening becomes brittle, and chips break off at the plunger seat and nipple guide incident to rough handling of the coupling.

After a tight fit is no longer obtainable between the coupling body and the nipple, the only course left to pursue is to substitute a new coupling body for the old. This is a costly and time-consuming procedure.

It is, therefore, one of the primary objects of my invention to provide a novel member associated with the coupling body, formed from hard, wear-resisting material for engaging the nipple, whereby wear will take place on said member, and the necessity of hardening the coupling body to a point of brittleness is eliminated.

Another important feature of my invention is to provide means for detachably associating the wear-resisting member with said coupling body, whereby when appreciable wear finally does take place thereon, the member can be quickly removed and replaced at a small cost without disturbing any other part of the coupling body.

A still further object of my invention is to provide a grease coupling of the button type having a removable spring steel slipper detachably mounted in the guideway for the flanged head of the nipple for resisting wear, having means for detachably engaging a part of the coupling body, whereby accidental displacement of the slipper will be prevented during normal use of the coupling.

With these and other objects in view, the invention consists in the novel construction, arrangement, and formation of parts, as will be hereinafter more specifically described, claimed, and illustrated in the accompanying drawing, in which drawing:

Figure 1 is a central sectional view through a coupling, showing the coupling body connected with the nipple and illustrating my novel detachable slipper in place.

Figure 2 is a sectional view through the coupling body detached from the nipple, taken at right angles to Figure 1, the view showing the detachable slipper in place.

Figure 3 is a bottom plan view of the coupling body, with parts thereof broken away and in section, showing the detachable slipper in place.

Figure 4 is a plan view of the detachable slipper per se.

Figure 5 is a longitudinal sectional view through the slipper, taken on the line 5—5 of Figure 4, looking in the direction of the arrows.

Referring to the drawing in detail, wherein similar reference characters designate corresponding parts throughout the several views, the letter C generally indicates a grease fitting comprising a coupling body 10 and a grease-receiving nipple 25. The grease-receiving nipple 25 is adapted to be connected to the part to be lubricated, as is well understood by persons skilled in the art.

The coupling body 10 is provided with a substantially centrally disposed chamber 11, the lower end of which is provided with a seat 12 for a plunger 13. The plunger 13 carries a leather cup 14 held thereon by a washer 15. The leather cup snugly engages the side wall of the chamber 11. The upper end of the chamber 11 is closed by a removable plug 16, and an expansion coil spring 17 is interposed between the plug and the plunger for normally holding the plunger on its seat 12. The plunger is axially apertured so as to permit the flow of grease therethrough under pressure. The body 10 is provided with one or more internally threaded bores 18 communicating with the body. The internally threaded bore forms means for permitting the connection of the body with a grease-carrying pressure hose or grease-gun, as the case may be.

The inner end of the body 10 has formed thereon a guideway 19 for detachably receiving the upper end of the nipple 25. The guideway 19 is of a substantially U-shape in bottom plan, and the same is open at its forward end, as at 20, and closed at its outer end by an arcuate wall 21. The guideway, in effect, defines inner and outer spaced walls 22 and 23. The plunger 13 is disposed inside the guideway 19.

The nipple 25 is of the button type, and includes a polygonal-shaped body 26 having a depending threaded stem 27 for connection with the part to be lubricated. The polygonal body 26 carries the flanged button head 28, which is adapted to be detachably received in the guideway 19. The nipple is provided with an internal chamber 29, which carries at its outer end a seat 30 for the spring-pressed closure valve 31. When grease under pressure is forced against the nipple, the valve 31 is unseated, allowing the flow of grease into the nipple, and thence to the part to be lubricated. As is clearly shown in Figure 1, the plunger 13 fits firmly against the outer end of the button head 28 and surrounds the nipple inlet or valve seat.

The construction, so far, can be considered as of the type now generally employed in grease fittings, and further detailed description thereof is deemed superfluous.

Great wear takes place on the lower wall 22 of the guideway 19, and, as stated, effort has been made to resist or minimize this wear. The body, at its lower end, has been case-hardened, and while the hardened metal resists wear, the same becomes very brittle, and the metal tends to chip around the plunger seat and in the guide 19, incident to rough handling of the coupling body. Likewise, when wear finally does take place, the entire coupling body has to be thrown away.

In accordance with my invention, I utilize a removable slipper 35 for the guideway 19. This slipper is formed from wear-resisting material, such as hard spring steel. Thus, when the slipper 35 is associated with the guideway, the slipper is the part that receives the strain and the greatest wear, and it forms a protection for the walls of the guideway. This eliminates the necessity of hardening the coupling body to such an extent that the metal becomes brittle. It is proposed, however, to slightly harden the body of the coupling, so that the same will not become distorted, incident to rough handling.

The slipper 35 is of a substantially U- or horseshoe-shape in plan, and, thus, conforms closely to the shape of the guide 19. The slipper, in cross section, is of an L-shape, and when the slipper is positioned in the guideway, the same covers the outer wall 22 of the guideway and the side wall of the guideway. Thus, these walls are thoroughly protected.

The slipper has formed thereon a rearwardly extending spring arm 36 terminating in a right-angularly extending lip or detent. The body of the coupling has formed therein an opening 24 communicating with the guideway 19 for receiving the arm 36, and when the slipper is inserted fully into the guideway, the detent 37 snaps over the outer face of the body. Thus, the slipper is firmly held in the guideway against accidental displacement during normal use of the coupling.

By this novel construction and arrangement of parts, the slipper is detachably secured in place, and, thus, when wear finally takes place on the slipper, the same can be instantly removed from the coupling body 10 by pushing up on the detent 37 and flexing the arm 36 until the detent rides into the opening 24, at which time the slipper can be pushed out of the guideway. A new slipper can then be inserted in the guideway.

Thus, the only part that has to be renewed when wear occurs is the slipper, and no parts of the body are tampered with at all during the placing of a slipper in position, or during the removing of the slipper from the body. Thus, replacement of the entire coupling body, when wear takes place, is eliminated.

Changes in details may be made without departing from the spirit or the scope of my invention, but what I claim as new is:

1. In a grease fitting, a coupling body having a guideway, a nipple having a flanged head for detachable reception in said guideway, said body having an opening communicating with the guideway, and a detachable slipper fitted in said guideway shaped to conform to the configuration of the guideway and engaging the flanged head of the nipple, a resilient arm on the slipper adapted to be received in the opening, and a detent on said arm for engaging a part of the body to hold the slipper against accidental displacement.

2. A detachable wear-resisting slipper for the guideways of coupling bodies comprising, a liner member U-shaped in plan, and L-shaped in cross section, said member being formed from hardened spring steel, and a spring latching arm formed on said member for detachably engaging a part of a coupling body.

JOHN W. RICHARDSON.